(No Model.)
J. F. NELSON.
SHUT-OFF DEVICE FOR PIPES.
No. 521,938. Patented June 26, 1894.
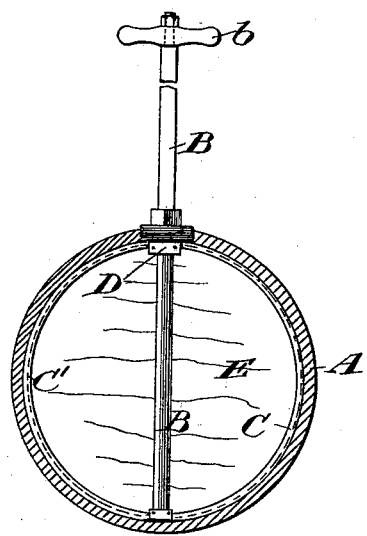
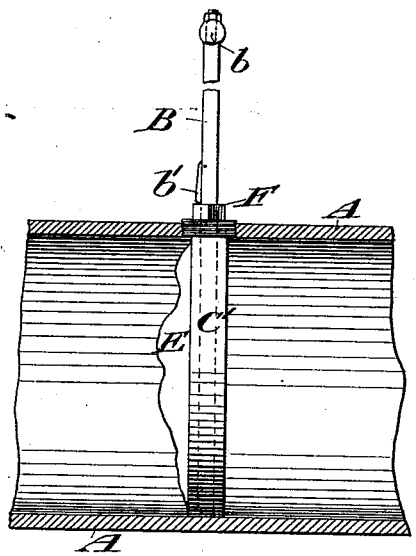 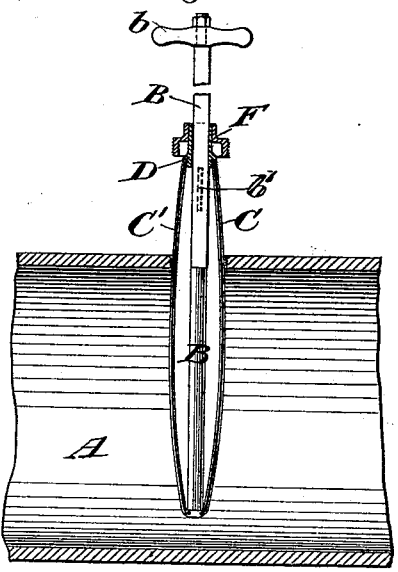
Witnesses:—
George Barry,
F. B. Seward
Inventor:—
John F. Nelson
by attorneys
Brown & Seward

UNITED STATES PATENT OFFICE.

JOHN F. NELSON, OF NEW YORK, N. Y., ASSIGNOR OF ONE-HALF TO EUGENE NELSON, OF SAME PLACE.

SHUT-OFF DEVICE FOR PIPES.

SPECIFICATION forming part of Letters Patent No. 521,938, dated June 26, 1894.

Application filed February 23, 1894. Serial No. 501,094. (No model.)

*To all whom it may concern:*

Be it known that I, JOHN F. NELSON, of New York, in the county and State of New York, have invented a new and useful Improvement in Shut-Off Devices for Pipes, of which the following is a specification.

My invention relates to an improvement in removable shut-off devices for pipes, one object being to provide a device which, when inserted within a pipe or main, will effectually shut off the flow of fluid or liquid therethrough.

A further object is to provide a device of this character which will be simple in construction and very durable and which may be quickly put into use.

My device is adapted to be used to shut off the supply of liquid or fluid through a pipe when it is desired to attach another pipe thereto or to remove a section because of breakage, or for any other cause where it is desired that the fluid or liquid should not flow beyond a certain point in the pipe.

A practical embodiment of my invention is represented in the accompanying drawings, in which—

Figure 1 is a cross section through a gas pipe, showing my device inserted therein and in its extended position for shutting off the flow of gas through the pipe. Fig. 2 is a longitudinal section through the pipe, showing my device in side elevation in its extended position, and Fig. 3 is a similar view, showing my device partially in section and collapsed, and also showing the manner of inserting it into and withdrawing it from the pipe.

I have shown and will describe my device in connection with a gas pipe, but I wish it understood that I do not limit it to such use, as it may be employed to shut off the flow of water, or steam, or wherever it is necessary to insert a liquid or fluid tight removable partition within a pipe for any cause.

A designates a gas pipe or main and it has a screw-threaded opening tapped therein for the insertion of and withdrawal from the pipe of my improved shut-off device.

In my device, B is a rod of rigid material, preferably metal, and to one end thereof is attached a suitable handle $b$. To its opposite end are hinged the outer ends of two spring arms C, C'. The inner ends of the spring arms are hinged to a sliding sleeve D on the rod B. The portion of the rod on which the sleeve D slides is squared, so as to prevent the sleeve from turning, as it is slid outwardly and inwardly along the rod. The sleeve is held normally at the innermost limit of its sliding movement, as the tendency of the spring arms C, C' is to straigthen and lie along the rod B. When the sleeve is slid forward on the rod, the spring arms are caused to bow outwardly away from each other, forming a hoop or ring.

The arms C, C' are covered with canvas or other suitable material, so that when the hoop is in its expanded position against the inner walls of the pipe A, it will effectually prevent the passage of the gas between the hoop and the walls.

A screw plug F is mounted on the rod B and is adapted to be screwed into the opening formed in the pipe A for the insertion of the shut-off device, and thereby secure the spring arms in expanded adjustment. The arms are temporarily held expanded, until the plug F is screwed home, by means of a spring catch $b'$ on the rod, which engages the sleeve D and prevents it from sliding back after it has been slid forward to expand the arms.

A piece of impervious, flexible material E, preferably oiled cloth, which will resist the passage of gas therethrough is secured along its edges to the hoop formed by the spring arms, in such a manner that when the hoop is in its expanded position within the pipe, it will effectually stop the flow of gas therethrough.

In practice, suppose it to be necessary to stop the flow of gas at a certain point in the pipe. A screw-threaded opening, the size of the screw plug F, is tapped in the pipe and the shut-off device, in its collapsed position, is inserted through the opening into the pipe. The sleeve D is then pushed forward, past the catch $b'$, expanding the hoop snugly against the inner walls of the pipe and forming an impervious partition therein. To prevent the escape of gas through the opening in the pipe, the screw plug F is then screwed into the opening, thereby effectually closing it. When it is desired to withdraw the device, the plug F is unscrewed from the opening, the spring b' depressed, releasing the sleeve and allowing it to slide rearwardly and also, allowing the hoop to collapse, so that the whole may be readily removed from the pipe through the said opening therein.

Among the advantages of my device, is the fact that if, from any cause, the fabric should be punctured, only the gas that could pass through the hole just made would escape, while if the inflated rubber bag, now in use for cutting off the flow of gas should be punctured, the bag would collapse, allowing the gas to escape freely.

If found desirable, the catch b' may be dispensed with, depending solely upon the screw plug F for holding the hoop in its extended position within the pipe.

My device may be made of different sizes to fit pipes of varying diameters, is very convenient to handle and will withstand a great amount of rough usage without impairing its efficiency.

It is obvious that slight changes might be resorted to in the form and arrangement of parts, other than those which I have particularly referred to, without departing from the spirit and scope of my invention, hence I do not wish to limit myself strictly to the construction and arrangement herein set forth, but

What I claim is—

1. A shut-off device for pipes, comprising a rod, a sleeve adapted to slide on the rod, spring arms hinged at their outer ends to the rod, and at their inner ends to the sleeve, an impervious flexible material secured to the arms in such a manner as to expand and collapse with the arms and means for holding the arms in expanded adjustment, substantially as set forth.

2. A shut-off device for pipes, comprising a rod, a sleeve adapted to slide on the rod, spring arms hinged at their outer ends to the rod, and at their inner ends to the sleeve, an impervious flexible material secured to the arms in such a manner as to expand and collapse with the arms, and a screw-plug on the rod in position to enter the opening made in the pipe for the insertion of the shut-off device and secure the arms in expanded adjustment, substantially as set forth.

3. A shut-off device for pipes, comprising a rod, a sleeve adapted to slide on the rod, spring arms hinged at their outer ends to the rod, and at their inner ends to the sleeve, an impervious flexible material secured to the arms in such a manner as to expand and collapse with the arms, a catch on the rod for engaging the sleeve and temporarily holding the arms in their expanded position, and a screw-plug on the rod for closing the opening formed in the pipe for the insertion of the shut-off device, the said plug serving to secure the arms in extended adjustment and to prevent the escape of gas through the said opening in the pipe, substantially as set forth.

JOHN F. NELSON.

Witnesses:
IRENE B. DECKER,
FREDK. HAYNES.